United States Patent
Kaukovuori et al.

(10) Patent No.: US 9,848,394 B2
(45) Date of Patent: Dec. 19, 2017

(54) METHODS, APPARATUS AND COMPUTER PROGRAMS FOR CONTROLLING POWER OF WIRELESS TRANSMISSIONS

(71) Applicant: Avago Technologies General IP (Singapore) Pte. Ltd., Singapore (SG)

(72) Inventors: Jouni Kristian Kaukovuori, Vantaa (FI); Antti Oskari Immonen, Helsinki (FI)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 66 days.

(21) Appl. No.: 14/426,676

(22) PCT Filed: Sep. 10, 2013

(86) PCT No.: PCT/IB2013/058425
§ 371 (c)(1),
(2) Date: Mar. 6, 2015

(87) PCT Pub. No.: WO2014/041480
PCT Pub. Date: Mar. 20, 2014

(65) Prior Publication Data
US 2015/0289215 A1 Oct. 8, 2015

(30) Foreign Application Priority Data
Sep. 12, 2012 (GB) .................................. 1216294.7

(51) Int. Cl.
*H04W 52/34* (2009.01)
*H04W 52/14* (2009.01)
(Continued)

(52) U.S. Cl.
CPC ............... *H04W 52/34* (2013.01); *H04J 4/00* (2013.01); *H04W 52/14* (2013.01);
(Continued)

(58) Field of Classification Search
None
See application file for complete search history.

(56) References Cited

U.S. PATENT DOCUMENTS

2012/0127933 A1* 5/2012 Worrall ............... H04W 52/367
370/329
2012/0176979 A1 7/2012 Kim et al.
(Continued)

FOREIGN PATENT DOCUMENTS

EP 2360979 8/2011
FR WO 2012177218 A2 * 12/2012 ........... H04B 7/0693
(Continued)

OTHER PUBLICATIONS

International Search Report for PCT/IB2013/058425 dated Jan. 28, 2014.
(Continued)

*Primary Examiner* — Chi H Pham
*Assistant Examiner* — Vladislav Agureyev
(74) *Attorney, Agent, or Firm* — Foley & Lardner LLP (57) ABSTRACT

A network signal value is received (610) from one or more access points in response to a request to employ carrier aggregation. An additional maximum power reduction of a plurality of uplink and downlink signals among two or more radio bands is selectively produced (620) based upon the network signal value and a plurality of dynamic additional maximum power reduction parameters.

19 Claims, 9 Drawing Sheets

(51) Int. Cl.
| | |
|---|---|
| *H04W 52/16* | (2009.01) |
| *H04W 52/36* | (2009.01) |
| *H04J 4/00* | (2006.01) |
| *H04W 72/04* | (2009.01) |
| *H04L 5/00* | (2006.01) |

(52) U.S. Cl.
CPC ......... *H04W 52/146* (2013.01); *H04W 52/16* (2013.01); *H04W 52/367* (2013.01); *H04W 72/0406* (2013.01); *H04W 72/0473* (2013.01); *H04L 5/001* (2013.01)

(56) References Cited

U.S. PATENT DOCUMENTS

| | | | | |
|---|---|---|---|---|
| 2012/0178494 | A1* | 7/2012 | Haim | H04W 52/365 455/522 |
| 2012/0224552 | A1 | 9/2012 | Feuersanger et al. | |
| 2012/0257519 | A1* | 10/2012 | Frank | H04L 5/0035 370/252 |
| 2013/0010720 | A1* | 1/2013 | Lohr | H04L 1/0026 370/329 |
| 2013/0053088 | A1* | 2/2013 | Thorson | H04B 1/525 455/522 |
| 2013/0182663 | A1* | 7/2013 | Ji | H04W 72/0473 370/329 |
| 2013/0223406 | A1* | 8/2013 | Vujcic | H04L 5/001 370/331 |
| 2014/0044063 | A1* | 2/2014 | Lim | H04W 52/04 370/329 |
| 2015/0087296 | A1* | 3/2015 | Kim | H04W 52/365 455/422.1 |

FOREIGN PATENT DOCUMENTS

| | | | |
|---|---|---|---|
| GB | 2488201 | 8/2012 | |
| KR | 20110110700 A | * 10/2011 | ......... H04W 52/367 |

OTHER PUBLICATIONS

Written Opinion for PCT/IB2013/058425 dated Jan. 28, 2014.
International Preliminary Report on Patentability for for PCT/IB2013/058425 dated Mar. 17, 2015.
TSG RAN WG4: "Draft Response LS on TDD inter-band CA with different UL-DL configurations on different bands", 3GPP Draft; R4-115224, 3rd Generation Partnership Project (3GPP), Mobile Competence Centre ; 650, Route Des Lucioles ; F-06921 Sophia-Antipolis Cedex ; France, vol. RAN WG4, No. Zhuhai; Oct. 10, 2011, Oct. 3, 2011 (Oct. 3, 2011), XP050544286, [retrieved on Oct. 3, 2011].
Nokia Corporation: "Correction of A-MPR for CA_1C in Japan", 3GPP Draft; R4-124327 Correction of A-MPR For CA_1C in Japan Rel10, 3rd Generation Partnership Project (3GPP), Mobile Competence Centre ; 650, Route Des Lucioles ; F-06921 Sophia-Antipolis Cedex; France vol. RAN WG4, No. Qingdao; Aug. 13, 2012-Aug. 17, 2012 Aug. 6, 2012 (Aug. 6, 2012), XP050671988, Retrieved from the Internet: URL: http://www.3gpp.org/ftp/tsgran/WG4_Radio/TSGR4_64/Docs/ [retrieved on Aug. 6, 2012].
Ericsson: "Response paper to R3-120756, R3-120757 and R3-120598", 3GPP Draft; R3-120786, 3rd Generation Partnership Project (3GPP), Mobile Competence Centre ; 650, Route Des Lucioles ; F-06921 Sophia-Antipolis Cedex; France, vol. RAN WG3, No. San Jose del Caba, Mexico; Mar. 26, 2012-Mar. 30, 2012, Mar. 22, 2012 (Mar. 22, 2012), XP050610801, [retrieved on Mar. 22, 2012].
Combined Search and Examination Report for GB Application No. 1216294.7 dated Jan. 7, 2013.
Examination Report under Section 18(3) for GB Application No. 1216294.7 dated Apr. 1, 2015.

* cited by examiner

METHODS, APPARATUS AND COMPUTER PROGRAMS FOR CONTROLLING POWER OF WIRELESS TRANSMISSIONS

CROSS REFERENCE TO RELATED APPLICATION

This application is the U.S. National Stage of International Patent Application Number PCT/IB2013/058425, filed Sep. 10, 2013, which claims the benefit under 35 U.S.C. §119 and 37 CFR §1.55 to UK patent application no. 1216294.7, filed on Sep. 12, 2012, the entire contents of which are incorporated herein by reference for all purposes.

TECHNICAL FIELD

The present invention relates generally to methods, apparatus and computer programs for controlling power of wireless transmissions. The example and non-limiting embodiments of this invention relate generally to wireless communication systems, methods, devices and computer programs, and specific embodiments relate to reducing out-of-band emissions and spurious transmissions in a wireless communication system supporting carrier aggregation.

BACKGROUND

Currently, network signalling (NS) techniques are being investigated to improve carrier aggregation (CA) operations by the 3rd Generation Partnership Project (3GPP) in the Technical Specification Group Radio Access Network No. 4 (TSG RAN4) to support the progression of Long Term Evolution Advanced (LTE-Advanced or LTE-A) and beyond (LTE-B). Carrier aggregation allows an evolved Node B (eNodeB) to group several distinct carrier channels into one logical channel to provide enhanced wider transmission bandwidths over prior releases which were limited to transmission over a single 20 MHz channel. Each aggregated carrier is referred to as a component carrier (CC) which can have a bandwidth of 1.4, 3, 5, 10, 15 or 20 MHz. CA can support up to five 20 MHz component carriers (CCs) to achieve high-bandwidth transmission, such as peak data rates of 1 Gbps in downlink (DL) reception and 500 Mbps in uplink (UL) transmission.

There are multiple configurations possible with CA which are generally described in three different spectrum scenarios: intraband contiguous CA, intraband non-contiguous CA and interband (non-contiguous) CA. Intraband contiguous CA and Intraband non-contiguous CA aggregates CCs in the same operating band. Contiguous carriers are defined as two or more carriers configured in a spectrum block where there are no radio frequency (RF) requirements based on co-existence for un-coordinated operation within the spectrum block. Interband (non-contiguous) CA aggregates CCs in different operating bands.

Multiple-band operations such as interband non-contiguous CA can also aggregate both UL/DL CCs in both frequency division duplex (FDD) and time division duplex (TDD) operations. In FDD operations, the number of aggregated carriers can be different in DLs and ULs with the caveat that the number of UL component carriers is often equal to or lower than the number of DL CCs. Moreover, the individual component carriers can also be of different bandwidths. In TDD operations, the number of CCs and the bandwidth of each CC may be the same for DL and UL. Alternatively, TDD operations may allow for an unequal number of CCs.

However, aggregating multiple operating bands among UL/DL CCs in mixed FDD and TDD CA is not currently possible.

The following abbreviations which may be found in the specification and/or the drawing figures are defined as follows:

3GPP 3rd Generation Partnership Project
A-MPR additional maximum power reduction
AP Access Point
CA carrier aggregation
CC component carrier
D-AMPR dynamic additional maximum power reduction
DB dual-band
DC dual-carrier
DL downlink
eNode B evolved Node B
E-UTRAN Evolved Universal Terrestrial Radio Access Network
FDD frequency division duplex
FE front-end
GLONASS Globalnaya Navigatsionnaya Sputnikovaya Sistema
GNSS global navigation satellite system
GPS global positioning system
LTE Long Term Evolution
LTE-A Long Term Evolution-Advanced
LTE-B Long Term Evolution-Beyond
NS network signalling
OOB out-of-band emissions
PSD power spectral density
TDD time division duplex
UE user equipment
UL uplink

SUMMARY

According to a first aspect of the present invention, there is provided a method including receiving a network signal value assigned from one or more access points in response to a request to employ carrier aggregation, and selectively producing an additional maximum power reduction of a plurality of uplink and downlink signals among two or more bands based upon the network signal value and a plurality of dynamic additional maximum power reduction parameters, wherein the dynamic additional maximum power reduction parameters selectively reduce power of one or more first links depending on the activity of one or more second links.

According to a second aspect of the present invention, there is provided apparatus for use in a user equipment including circuitry adapted to cause the apparatus to at least receive a network signal value from one or more access points in response to a request to employ carrier aggregation, and selectively produce an additional maximum power reduction of a plurality of uplink and downlink signals among two or more bands based upon the network signal value and a plurality of dynamic additional maximum power reduction parameters, wherein the dynamic additional maximum power reduction parameters selectively reduce power of one or more first links depending on the activity of one or more second links.

According to a third aspect of the present invention, there is provided a computer program comprising instructions executable by a machine for causing the machine to perform operations including receiving a network signal value from one or more access points in response to a request to employ carrier aggregation, and selectively producing an additional maximum power reduction of a plurality of uplink and downlink signals among two or more bands based upon the network signal value and a plurality of dynamic additional maximum power reduction parameters, wherein the dynamic additional maximum power reduction parameters selectively reduce power of one or more first links depending on an activity of one or more second links.

According to a fourth aspect of the present invention, there is provided a method including sending one or more network signal values to one or more user equipment adapted for carrier aggregation, wherein the one or more user equipment is instructed to selectively produce an additional maximum power reduction of a plurality of uplink and downlink signals among two or more bands based upon the network signal value and a plurality of dynamic additional maximum power reduction parameters.

According to a fifth aspect of the present invention, there is provided apparatus for use in a user equipment including circuitry adapted to cause the apparatus to at least send one or more network signal values to one or more user equipment adapted for carrier aggregation, wherein the one or more user equipment is instructed to selectively produce an additional maximum power reduction of a plurality of uplink and downlink signals among two or more bands based upon the network signal value and a plurality of dynamic additional maximum power reduction parameters.

According to a sixth aspect of the present invention, there is provided a computer program comprising instructions executable by a machine for performing operations, including sending one or more network signal values to one or more user equipment adapted for carrier aggregation, wherein the one or more user equipment is instructed to selectively produce an additional maximum power reduction of a plurality of uplink and downlink signals among two or more bands based upon the network signal value and a plurality of dynamic additional maximum power reduction parameters There may be provided apparatus including means for receiving a network signal value from one or more access points in response to a request to employ carrier aggregation, means for selectively producing an additional maximum power reduction of a plurality of uplink and downlink signals among two or more bands based upon the network signal value and a plurality of dynamic additional maximum power reduction parameters, wherein the dynamic additional maximum power reduction parameters selectively reduce power of one or more first links depending on the activity of one or more second links.

There may be provided apparatus including means for sending one or more network signal values to one or more user equipment adapted for carrier aggregation, wherein the one or more user equipment is instructed to selectively produce an additional maximum power reduction of a plurality of uplink and downlink signals among two or more bands based upon the network signal value and a plurality of dynamic additional maximum power reduction parameters.

There may be provided a program storage device readable by a machine, tangibly embodying a program of instructions executable by a machine for causing the machine to perform operations as described above.

Further features and advantages of the invention will become apparent from the following description of preferred embodiments of the invention, given by way of example only, which is made with reference to the accompanying drawings.

These and other embodiments and aspects are detailed below with particularity.

DETAILED DESCRIPTION

Some example embodiments of this invention provide apparatus, methods, and computer programs that selectively produce an additional maximum power reduction of a plurality of uplink and downlink signals in one or more user equipment adapted for carrier aggregation among two or more Evolved Universal Telecommunication Radio Access Network bands based upon a network signal value assignment and a plurality of dynamic additional maximum power reduction parameters.

The transmission output power of a cellular radio transmitter transmitting in a Universal Terrestrial Radio Access Network (EUTRAN) is required to minimise undesired out-of-band (OOB) emissions to avoid interfering with other radio equipment or systems. For example, as described in 3GPP TS 36.3101, V11.1.0 (2012-06), 3rd Generation Partnership Project; Technical Specification Group Radio Access Network; Evolved Universal Terrestrial Radio Access (E-UTRA); User Equipment (UE) radio transmission and reception (Release 11): "Additional spectrum emission requirements are signalled by the network to indicate that the UE shall meet an additional requirement for a specific deployment scenario as part of the cell handover/broadcast message." To that end, user equipment (UE) is limited to a maximum output power of 23 dBm in UE Power Class 3. The UE must satisfy this requirement within a range of ±2 dB in most bands. However, for some bands this range can be relaxed to −2 dB. An eNodeB employs an additional maximum power reduction scheme (A-MPR) to keep the one or more UE transmission levels below the desired level for specific deployment scenarios, such as carrier aggregation (CA) operations to comply with regulatory limits (e.g. Federal Communications Commission regulations). The A-MPR scheme is a predetermined list which describes certain combinations of E-UTRAN bands, channel bandwidths and transmission bandwidths for UEs in single-band operation scenarios in accordance with Table 6.2.2-1 in 3GPP TS 36.101.

In such a static A-MPR scheme, if a time division duplex (TDD) and a frequency division duplex (FDD) band are aggregated, the interference scenario is somewhat altered compared to single band FDD operation or FDD+FDD CA. For example, the switching between UL and DL operation modes in TDD link can cause additional interference from FDD UL to TDD DL, or vice versa, if the bands are located closely. For example, in the extreme case, a TDD band can be located in the duplex gap of a certain FDD band (e.g. B38 and B7). Also, a static A-MPR scheme applies an unnecessary large A-MPR as the "worst case" is always considered. Worst case here means that A-MPR of both TDD and FDD would be designed in such a way that DL performance would always be secured, independent of the TDD band mode (UL/DL).

Figure 1A:
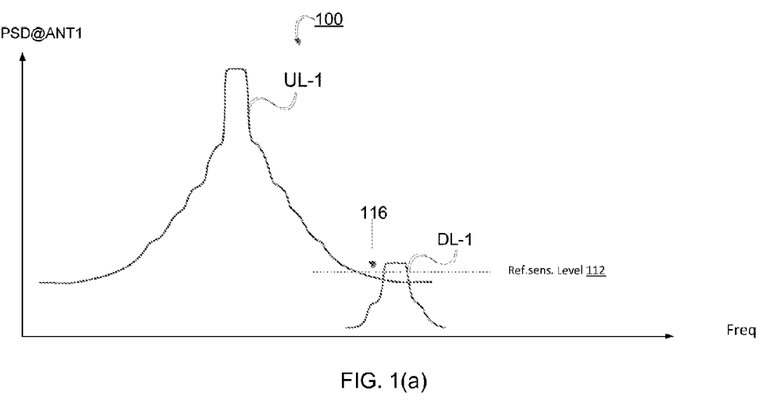
FIG. 1(a) illustrates one example of the single band operation in an FDD operation mode observed at antenna 1.
Figure 1B:
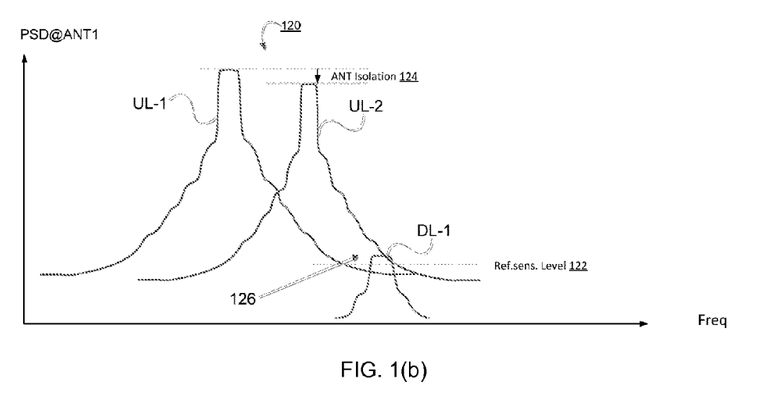
FIG. 1(b) illustrates adding an additional E-UTRAN band aggregated in the duplex gap of link 1 as shown in FIG. 1(a) observed at antenna 1.
Figure 1C:
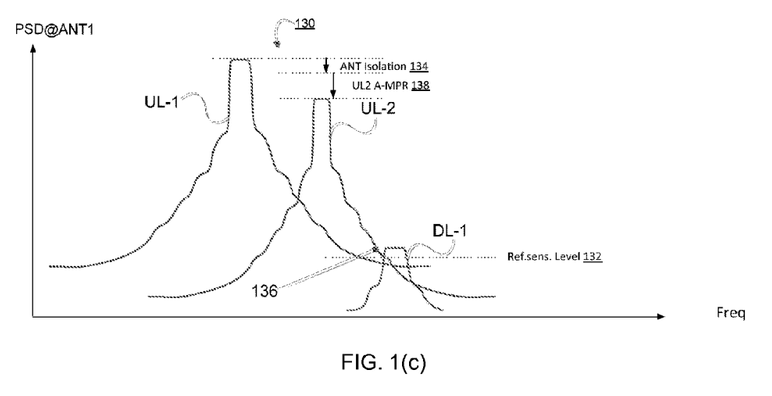
FIG. 1(c) illustrates applying a static A-MPR scheme in an FDD and TDD carrier aggregation operation in uplink mode observed at antenna 1.

FIGS. 1(a) though 1(c) show an example of interference among uplink and downlink signals in carrier aggregation in uplink mode employing a static A-MPR scheme employing two E-UTRAN bands, suitable for applying some example embodiments of the present invention. FIG. 1(a) discloses an example of single band operation among an uplink and downlink signal 100. As shown in FIG. 1(a), UL-1 and DL-1 have a specific power spectral density function over a frequency range. The leakage of UL-1 transmission (shown at position 116) is sufficiently below the reference sensitivity level 112 of DL-1. This approximation of UL leakage takes into account isolation/filtering provided by a duplex filter on the DL-1 side. FIG. 1(b) shows the effect of adding an additional E-UTRAN band 120 aggregated in the duplex gap of link 1 (e.g. UL-2 is added). Depending upon the front-end module and antenna arrangement of a UE, there might be some additional isolation between the links which is seen as additional filtering when UL-2 to DL-1 leakage is considered. The antennas of UL-1 and UL-2 are isolated 124. However, the UL-2 still causes significant de-sense on DL-1 (as shown at reference position 126 where UL-2 de-senses DL-1 above reference sense level 122). A static A-MPR scheme can be applied 130 to UL-2 as shown in FIG. 1(c). In particular, an A-MPR 138 is assigned for UL-2 in addition to antenna isolation 134. The result seen at reference point 136 is that the reception quality of DL-1 is sufficient. That is, DL-1 is now above the reference sense level 132. It is noted that when both ULs are configured, the maximum output power does not exceed the maximum UE power specified above.

Figure 2A:
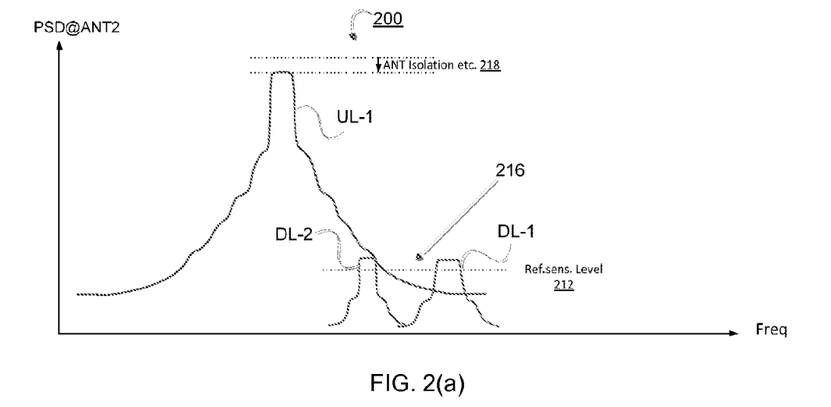
FIG. 2(a) illustrates one example of desensitisation in a FDD and TDD carrier aggregation operation in downlink mode observed at antenna 2.
Figure 2B:
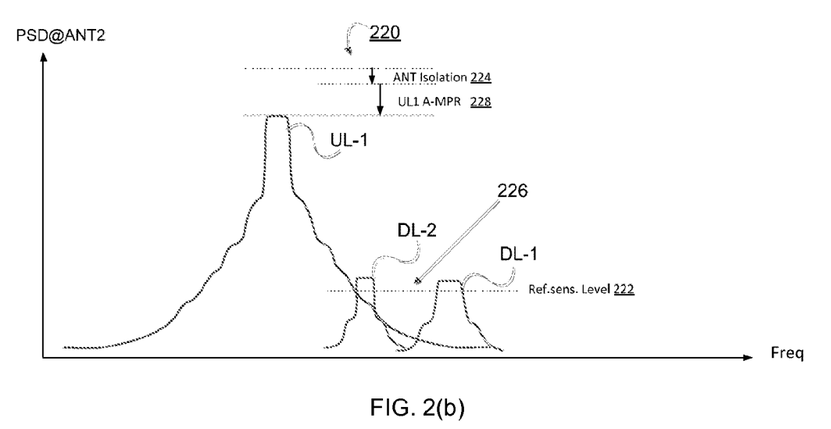
FIG. 2(b) illustrates one example of applying a static A-MPR scheme in FDD and TDD carrier aggregation operation in downlink mode observed at antenna 2.

FIGS. 2(a) and 2(b) show the same deployment scenario as FIGS. 1(a) to 1(c), except that link 2 is in downlink (DL) operation suitable for applying some example embodiments of the present invention. FIG. 2(a) shows two DL signals and one UL signal where one DL signal de-sensed the UL signal 200. In particular, DL-2 is de-sensed above reference sense level 212 by UL-1 even after applying antenna isolation 218 (as shown at reference point 216). FIG. 2(b) demonstrates the application of a static A-MPR to restore reception quality to DL-2 (220). The application of A-MPR 228 in addition to antenna isolation 224 places DL-2 above the reference sense level 222 as shown in reference location 226.

Figure 3A:
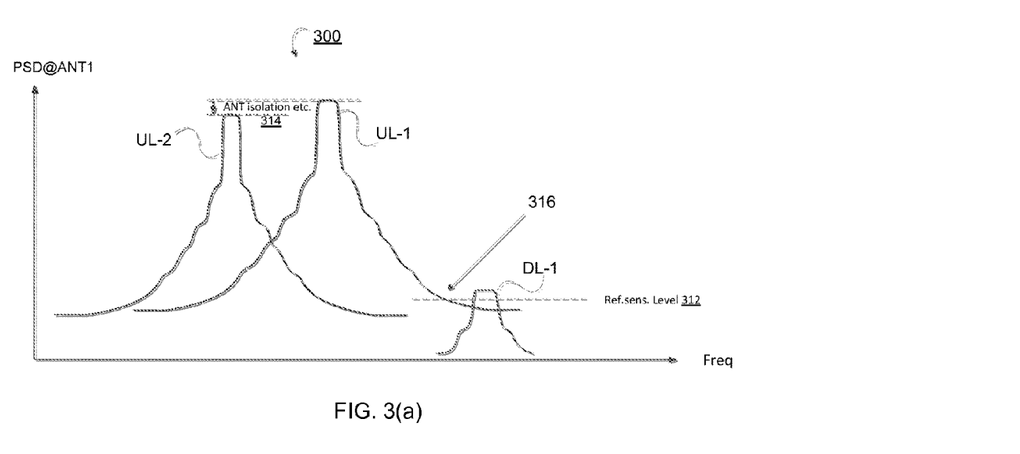
FIG. 3(a) illustrates one example of a TDD based carrier aggregation operation in uplink mode observed at antenna 1.
Figure 3B:
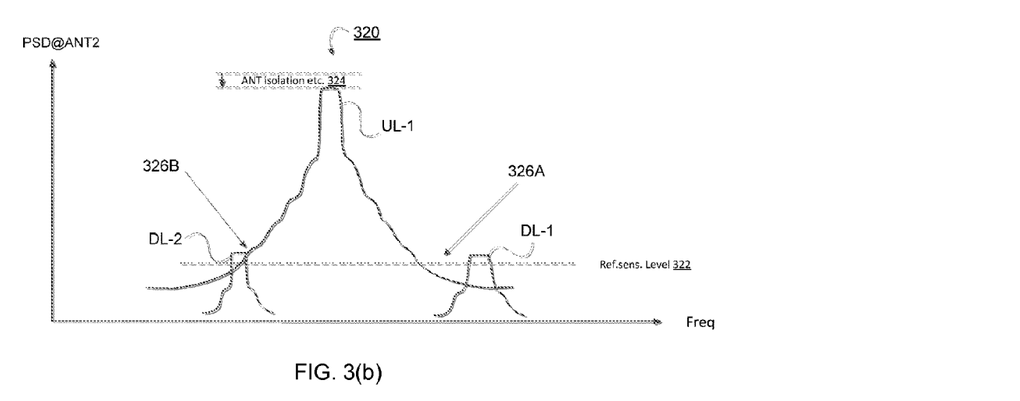
FIG. 3(b) illustrates one example of a TDD based carrier aggregation operation in downlink mode observed at antenna 2.
Figure 3C:
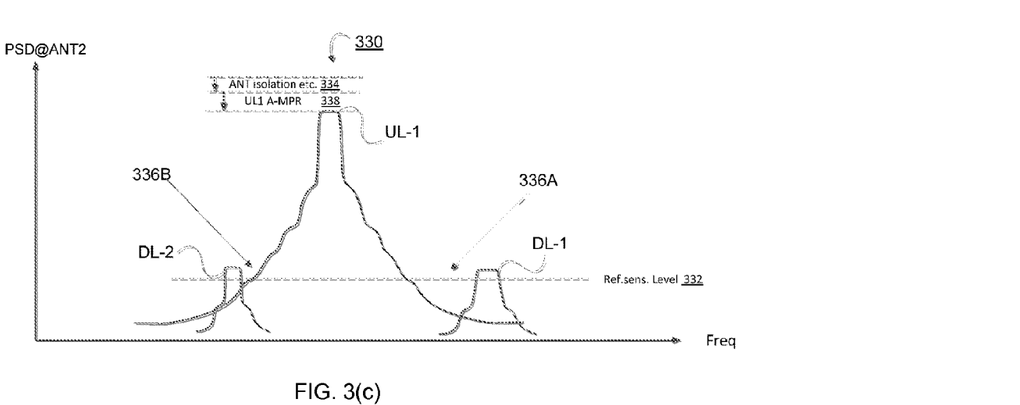
FIG. 3(c) illustrates one example of applying a static A-MPR scheme in TDD carrier aggregation operation in downlink mode observed at antenna 2.

FIGS. 3(a) thorough 3(b) show another uplink and downlink carrier aggregation deployment scenario where the TDD band is not located in the duplex gap of the FDD band and is suitable for applying example embodiments of the present invention. In FIG. 3(a), the TDD band is in UL operation mode 300. Again, the antenna isolation 314 provided by the front-end module and antenna element is taken into account when UL-2 leakage on DL-1 is considered. Clearly, as shown in FIG. 3(a) (as shown in reference point 316), there is no need to apply A-MPR for UL-2 as DL-1 is above the reference sense level 312. FIG. 3(b) illustrates a situation where the TDD band switches to DL operation mode 320. In this case, there is notable de-sense on DL-2 (as shown at reference point 326B) due to UL-1 leakage (even taking into account antenna isolation 324). DL-1 is not affected as shown at reference point 326A (which shows that DL-1 is above the reference sense level 322). FIG. 3(c) shows the application of A-MPR 338 (in addition to antenna isolation 334) to UL-1 to mitigate the de-sense of DL-2 (330). As shown in FIG. 3(c), DL-2 is below the reference sense level 332 (as shown at point 336B) and DL-1 is still unaffected (as shown in reference point 336A).

FIGS. 1(a)-3(c) provide non-limiting examples of possible scenarios for implementing some example embodiments of the present invention. For example, in the above deployment scenarios, E-UTRAN bands 7 and 38 might be paired, or an alternative pairing of bands could be employed. Moreover, the above-referenced TDD+FDD cases might happen at low-band configurations as new bands are being processed in 3GPP (e.g. such as newly added B44). Alternatively, several TDD bands exist around the 2-GHz vicinity which could be suitable for some example embodiments of the present invention. Furthermore, although TDD systems are claimed to have poor capacity as compared to FDD systems, due to heavily congested spectrum it is foreseen that in the future it will be easier to find a new unpaired TDD allocation than a paired FDD allocation with a sufficient duplex gap. Therefore, in the future there might be more interest directed towards new TDD bands in future releases of Long Term Evolution networks.

As shown above in the examples in FIGS. 1(a)-3(c), an A-MPR is required for UL-1 is when link 2 is in reception mode, but not when link 2 in is UL operation mode. If A-MPR for UL-1 is specified according to the worst case scenario and configured also during UL-2 period, it clearly results in an overall throughput penalty, for example. Therefore, it would be beneficial if the UL-1 output power is configured in a dynamic manner (for example, depending on the activity or operation mode of link 2 to maximise the link quality and performance, while still providing sufficient emission levels to maintain DL quality).

Figure 4:
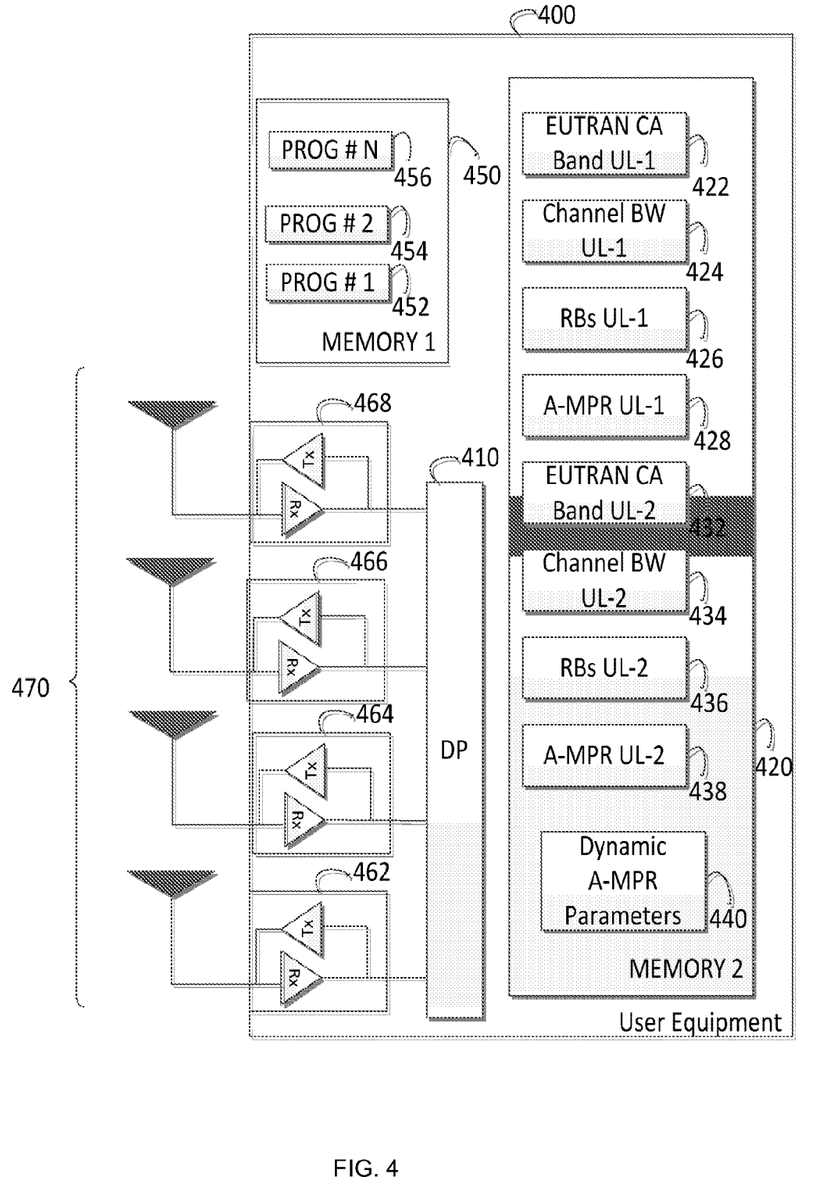
FIG. 4 is a simplified block diagram of an example electronic device (e.g. user equipment) suitable for use in practising some example embodiments of the invention.

Referring now to FIG. 4, a simplified block diagram of an example of a UE 400 is shown as an example of an electronic device suitable for use in practising some example embodiments of the invention. UE 400 includes one or more processors, such as at least one data processor, (DP) 410, and a first computer-readable memory 450 which stores a plurality of computer programs such as PROG #1 (452), PROG #2 (454) and PROG # N (456), suitable for carrying out the various example embodiments of the present invention. A second computer-readable memory 420 stores dynamic additional maximum power reduction (D-A-MPR) parameters 440, as well as various related A-MPR variables in accordance with example embodiments of the present invention. A-MPR variables related to a first active uplink signal stored in second memory 420 include a EUTRAN carrier aggregation band assigned to UL-1 422, a channel bandwidth assigned to UL-1 424, resource blocks assigned to UL-1 426 and an additional maximum power reduction assigned to UL-1 428. A-MPR variables related to a second active uplink signal stored in second memory 420 include: a EUTRAN carrier aggregation band assigned to UL-2 432, a channel bandwidth assigned to UL-2 434, resource blocks assigned to UL-2 436 and an additional maximum power reduction assigned to UL-2 438.

The DP 410 and PROG #1 (452) can be triggered by receiving a network signal (NS) value from an eNodeB to dynamically adjust active UL signals in various carrier aggregation deployment scenarios. The DP 410 and PROG #2 (454) can employ dynamic A-MPR parameters 440 to selectively produce an additional maximum power reduction of a plurality of uplink and downlink signals. In one example embodiment of the present invention, a network operator or a user can assign a first channel bandwidth, a first lowest resource block index, a first contiguous resource block allocation length, and a first additional maximum power reduction. In that same embodiment, the network operator or user can assign a second channel bandwidth, a second lowest resource block index, a second contiguous resource block allocation length and a second additional maximum power reduction. In that same embodiment, the network operator or user can assign a third channel bandwidth, a third lowest resource block index, a third contiguous resource block allocation length and a third additional maximum power reduction.

Although FIG. 4 depicts a first computer-readable memory 450 and a second computer-readable memory 420, UE 400 may include one or more additional memories, or fewer memory units. for carrying out some example embodiments of the present invention. Moreover, the programs described above (e.g. PROG #1 (452), and PROG #2 (454)) are not limited to specific memory locations (e.g. a first computer-readable memory 450 and a second computer-readable memory 420). FIG. 4 merely shows one possible non-limiting example embodiment of the present invention.

UE 400 may include a plurality of radio access communication modules 462, 464, 466, and 468, as well as a plurality of radio access technology antennas 470. In an alternative embodiment, a radio access communication module can be a modem. In some embodiments, the apparatus performing some embodiments of the invention does not include an antenna. The radio access communication modules can be a Long Term Evolution/Long Term Evolution Advanced/Long Term Evolution Beyond (LTE/LTE-A/LTE-B) transceiver, or any similar transceiver. Such non-limiting examples include any other transceiver capable of communicating with a Universal Mobile Telecommunications system, an Evolved Universal Mobile Telecommunications Terrestrial Radio Access Network, a Global System for Mobile communications, a Universal Terrestrial Radio Access network, or cellular networks employing Wideband Code Division Multiple Access or High Speed Packet Access.

Figure 5:
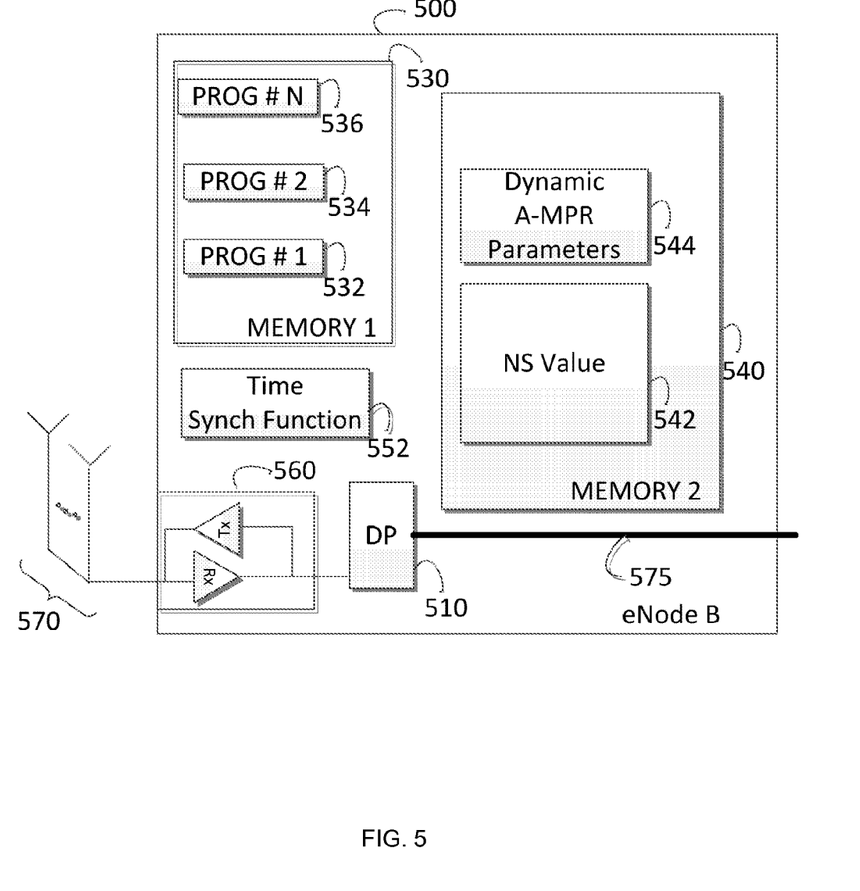
FIG. 5 is a simplified block diagram of a first access point or Node as an example electronic device suitable for use in practising some example embodiments of the invention.

Referring now to FIG. 5, a simplified block diagram of a first access point or node, which can be for example an evolved Node B (eNB) 500, is shown as an example electronic device suitable for use in practising some example embodiments of the invention. eNB 500 includes one or more processors, such as at least one data processor (DP) 510, a first computer-readable memory 530 (which stores a plurality of computer programs such as PROG #1 (532), PROG #2 (534) and PROG # N (536)), suitable for carrying out the various example embodiments of the present invention. A second computer-readable memory 540 stores a list of network signalling values 542 suitable for various carrier aggregation deployment scenarios in accordance with some example embodiments of the present invention. In addition, the second memory 540 includes various dynamic additional maximum power reduction parameters 544.

The DP 510 and PROG #1 (532) can be employed to send one or more network signal (NS) values to a plurality of user equipment employing carrier aggregation in accordance with some example embodiments of the present invention. The DP 510 and PROG #2 (534) can be employed to activate the time synchronisation function 552 to provide a common time reference among eNodeBs in the network. The time reference can be for example satellite navigation systems such as a global positioning system (GPS), GALILEO, global navigation satellite system (GNSS) or Globalnaya Navigatsionnaya Sputnikovaya Sistema(GLONASS). The time reference can be shared among eNodeBs over the S1 interface 575.

Although, FIG. 5 depicts a first computer-readable memory 530 and a second computer-readable memory 540, eNB 500 may include one or more additional memories, or fewer memory units, for carrying out some example embodiments of the present invention. Moreover, the programs described above (e.g. PROG #1 (532) and PROG #2 (534)) are not limited to a specific memory location (e.g. first computer-readable memory 530 and second computer-readable memory 540). FIG. 5 merely shows one possible non-limiting example embodiment of the present invention.

eNB 500 also includes a plurality of radio access communication modules 560 and a plurality of radio access technology antennas 570. The radio access communication module 360 can be a Long Term Evolution/Long Term Evolution Advanced/Long Term Evolution Beyond (LTE/LTE-A/LTE-B) transceiver, or any similar transceiver. Such non-limiting examples include any other transceiver capable of communicating with a Universal Mobile Telecommunications system, an Evolved Universal Mobile Telecommunications Terrestrial Radio Access Network, a Global System for Mobile communications, a Universal Terrestrial Radio Access network, or cellular networks employing Wideband Code Division Multiple Access or High Speed Packet Access.

Figure 6A:
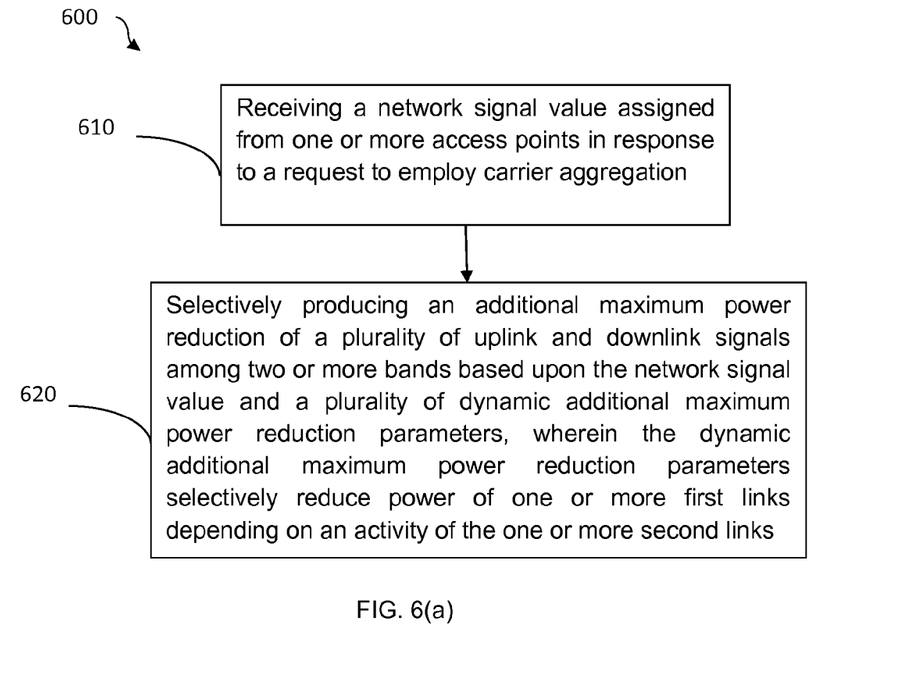
FIG. 6(a) is a flow diagram that illustrates the operation of a method, and a result of execution of computer program instructions embodied on a computer readable memory, in accordance with some exemplary embodiments of this invention.

FIG. 6(a) shows a flow diagram 600 that illustrates the operation of a method, and a result of execution of computer program instructions embodied on a computer readable memory, in accordance with some exemplary embodiments of this invention. In particular, an apparatus (e.g. a user equipment or some part of the user equipment) receives a network signal value from one or more access points in response to a request to employ carrier aggregation 610. For example, user equipment can be equipped with a modem adapted for receiving the network signal. The method and/or computer operation next selectively produces an additional maximum power reduction of a plurality of uplink and downlink signals among two or more bands based upon the network signal value and a plurality of dynamic additional maximum power reduction parameters, wherein the dynamic additional maximum power reduction parameters selectively reduce power of one or more first links depending on an activity of the one or more second links 620. In one embodiment, the band is transmitted in a Universal Mobile Telecommunications System, an Evolved Universal Mobile Telecommunications Terrestrial Radio Access Network (E-UTRAN), a Global System for Mobile communications (GSM), a Universal Terrestrial Radio Access network (UTRAN), or cellular networks employing Wideband Code Division Multiple Access (WCDMA) or High Speed Packet Access (HSPA).

Figure 6B:
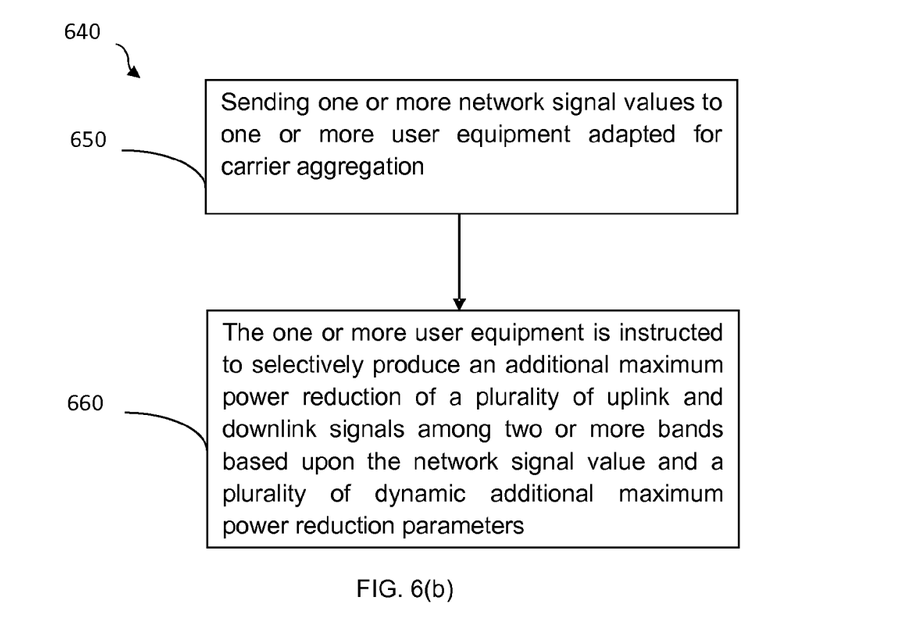
FIG. 6(b) is a flow diagram that illustrates the operation of a method, and a result of execution of computer program instructions embodied on a computer readable memory, in accordance with some exemplary embodiments of this invention.

FIG. 6(*b*) shows a flow diagram 640 that illustrates the operation of a method, and a result of execution of computer program instructions embodied on a computer readable memory, in accordance with some exemplary embodiments of this invention. In FIG. 6(*b*) an eNB sends one or more network signal values to one or more user equipment adapted for carrier aggregation 650, wherein the one or more user equipment is instructed to selectively produce an additional maximum power reduction of a plurality of uplink and downlink signals among two or more bands based upon the network signal value and a plurality of dynamic additional maximum power reduction parameters 660.

The method and computer operation employing network signalling value may further include assigning a first channel bandwidth, a first lowest resource block index, a first contiguous resource block allocation length, and a first additional maximum power reduction; assigning a second channel bandwidth, a second lowest resource block index, a second contiguous resource block allocation length, and a second additional maximum power reduction; and assigning a third channel bandwidth, a third lowest resource block index, a third contiguous resource block allocation length, and a third additional maximum power reduction.

Figure 7:
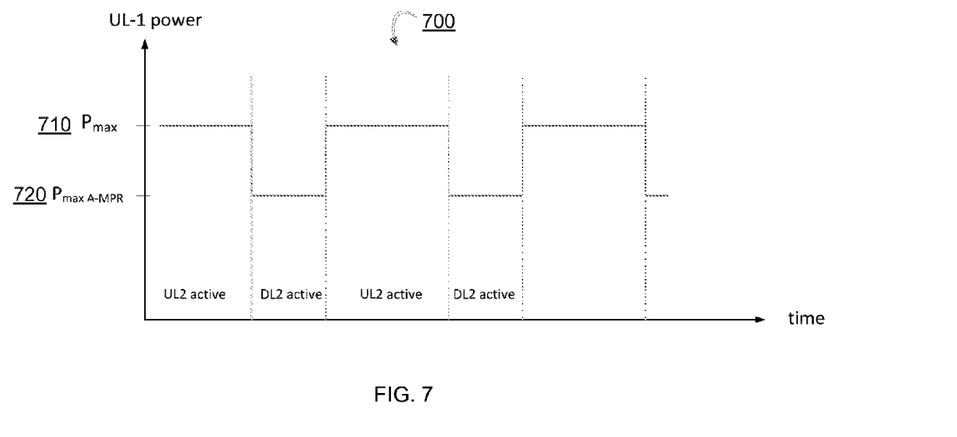
FIG. 7 illustrates an example embodiment of the maximum power for a user equipment employing carrier aggregation with power shown as a function of time.
Figure 8:
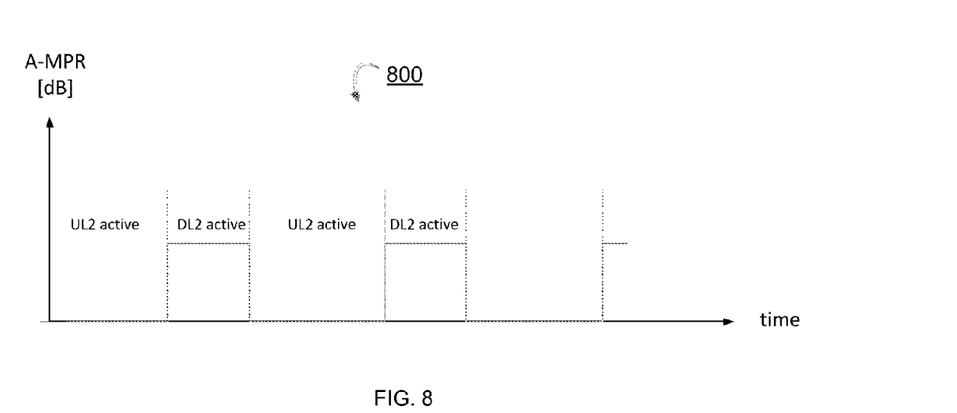
FIG. 8 illustrates an example embodiment of a dynamic additional power reduction of link 2 in accordance with some example embodiments of the present invention.

A non-limiting example embodiment of the present invention is shown in FIG. 7 which illustrates a dynamic A-MPR (D-AMPR) 700 where the maximum power level of a certain UL is controlled optimally such that it can be at maximum level when desired, but limited to a certain level when a specific CA operation mode is required. FIG. 7, shows a maximum power level $P_{max}$ 710 and a maximum power level adapted to additional maximum power reduction $P_{max\ A\text{-}MPR}$ 720. It should be noted that in the example below, D-AMPR for FDD band follows asymmetric UL/DL activity of TDD band. Thus, for optimal performance, and to avoid interference, the eNodeBs are synchronised to each other in the same coverage area. A timing reference is employed, such as global positioning system (GPS), GALILEO, global navigation satellite system (GNSS) or Globalnaya Navigatsionnaya Sputnikovaya Sistema (GLONASS). FIG. 8 illustrates the corresponding dynamic A-MPR (D-AMPR) as a function of link 2 activity 800 in accordance with an example embodiment of the present invention.

In one example embodiment of the present invention, the data set forth in Table 6.2.4-1 of 3GPP TS 36.3101, V11.1.0 (2012-06) can be modified to include a new network signalling value and a new column indicating carrier aggregation activity as shown below:

TABLE 6.2.4-1

Additional Maximum Power Reduction (A-MPR)

| Network Signalling value | Requirements (sub-clause) | E-UTRA Band | Channel bandwidth (MHz) | CA activity | Resources Blocks($N_{RB}$) | A-MPR (dB) |
|---|---|---|---|---|---|---|
| NS_01 | 6.6.2.1.1 | Table 5.5-1 | 1.4, 3, 5, 10, 15, 20 | — | Table 5.6-1 | NA |
| NS_03 | 6.6.2.2.1 | 2, 4, 10, 23, 25, 35, 36 | 3 | — | >5 | ≤1 |
|  |  |  | 5 | — | >6 | ≤1 |
|  |  |  | 10 | — | >6 | ≤1 |
|  |  |  | 15 | — | >8 | ≤1 |
|  |  |  | 20 | — | >10 | ≤1 |
| NS_04 | 6.6.2.2.2 | 41 | 5 | — | >6 | ≤1 |
|  |  |  | 10, 15, 20 | — | See Table 6.2.4-4 | |
| NS_05 | 6.6.3.3.1 | 1 | 10, 15, 20 | — | ≥50 | ≤1 |
| NS_06 | 6.6.2.2.3 | 12, 13, 14, 17 | 1.4, 3, 5, 10 | — | Table 5.6-1 | n/a |
| NS_07 | 6.6.2.2.3 6.6.3.3.2 | 13 | 10 | — | Table 6.2.4-2 | Table 6.2.4-2 |
| NS_08 | 6.6.3.3.3 | 19 | 10, 15 | — | >44 | ≤3 |
| NS_09 | 6.6.3.3.4 | 21 | 10, 15 | — | >40 | ≤1 |
|  |  |  |  | — | >55 | ≤2 |
| NS_10 |  | 20 | 15, 20 | — | Table 6.2.4-3 | Table 6.2.4-3 |
| NS_11 | 6.6.2.2.1 | 23[1] | 1.4, 3, 5, 10 | — | Table 6.2.4-5 | Table 6.2.4-5 |
| ... |  |  |  |  |  |  |
| NS_xx | 6.6.a.b.c | 7 | 5, 10, 15, 20 | Yes | Table 6.2.x-y | Table 6.2.x-y |
| NS_32 | — | — | — |  | — | — |

Note 1:
Applies to the lower block of Band 23, i.e., a carrier placed in the 2000-2010 MHz region.

Moreover, an additional dynamic A-MPR table can be added to 3GPP TS 36.101 for Band 7 when it is aggregated with B38 (NS value for an exemplary CA case 7+38) as one non-limiting example of the present invention as shown below:

TABLE 6.2.x-y

A-MPR for "NS_xx"

| Channel BW | Parameters | B38 activity DL active | B38 activity UL active |
|---|---|---|---|
| 5, 10 | RB_start1 | 0-8 | Any |
|  | L_CRB [RBs] | 1-20 | Any |
|  | A-MPR [dB] | ≤1 | 0 |
| 15 | RB_start1 | 0-10 | Any |
|  | L_CRB [RBs] | 1-20 | Any |
|  | A-MPR [dB] | ≤2 | 0 |
| 20 | RB_start 1 | 0-15 | Any |
|  | L_CRB [RBs] | 1-20 | Any |
|  | A-MPR [dB] | ≤5 | 0 |

Note
1 RB_start indicates the lowest RB index of transmitted resource blocks.
2 L_CRB is the length of a contiguous resource block allocation.
3 For intra-subframe frequency hopping which intersects Region A, notes 1 and 2 apply on a per slot basis.
4 For intra-subframe frequency hopping which intersect Region A, the larger A-MPR value may be applied for both slots in the subframe.

Also provided as an example embodiment of the present invention is a dynamic A-MPR table for UL carrier aggregation as shown below:

TABLE 6.2.X-Y

Additional Maximum Power Reduction (A-MPR) for UL CA

| NS value | Require (sub-clause) | E-UTRA CA Band UL1 | Channel BW UL1 (MHz) | RBs UL1 ($N_{RB}$) | A-MPR UL1 (dB) | E-UTRA CA Band UL2 | Channel BW UL2 (MHz) | RBs UL2 ($N_{RB}$) | A-MPR UL2 (dB) |
|---|---|---|---|---|---|---|---|---|---|
| NS_xx | 6.6.2.z.z | 7 | 5, 10, 15, 20 | Table 6.2.x-y | Table 6.2.x-y | 38 | 5, 10, 15, 20 | Table 6.2.z-y | Table 6.2.z-y |

In some example embodiments of the present invention, the definition of configured output power in 3GPP TS36.101 can be modified. For example, D-AMPR could be either added on top of A-MPR, or used individually, such that for inter-band carrier aggregation with up to one serving cell c per operating band:

$$P_{CMAX\_L\_CA} = \text{MIN}\{10 \log_{10} \Sigma \text{MIN}[p_{EMAX,c}/(\Delta t_{C,c}), p_{PowerClass}/(mpr_c \cdot a\text{-}mpr_c \cdot d\text{-}ampr_c \cdot \Delta t_{C,c} \cdot \Delta t_{IB,c}), p_{PowerClass}/(pmpr_c \cdot \Delta t_{C,c})], P_{PowerClass}\}$$

$$P_{CMAX\_H\_CA} = \text{MIN}\{10 \log_{10} \Sigma p_{EMAX,c}, P_{PowerClass}\} \quad \text{(Equation No. 1)}$$

or

For inter-band carrier aggregation with up to one serving cell c per operating band:

$$P_{CMAX\_L\_CA} = \text{MIN}\{10 \log_{10} \Sigma \text{MIN}[p_{EMAX,c}/(\Delta t_{C,c}), p_{PowerClass}/(mpr_c \cdot d\text{-}ampr_c \cdot \Delta t_{C,c} \cdot \Delta t_{IB,c}), p_{PowerClass}/(pmpr_c \cdot \Delta t_{C,c})], P_{PowerClass}\}$$

$$P_{CMAX\_H\_CA} = \text{MIN}\{10 \log_{10} \Sigma p_{EMAX,c}, P_{PowerClass}\} \quad \text{(Equation No. 2)}$$

where $MPR_c$, $A\text{-}MPR_c$ and $D\text{-}AMPR_c$ apply per serving cell c and are specified in Section 6.2.3 and Section 6.2.4, respectively, mprc is the linear value of $MPR_c$, a-$mpr_c$ is the linear value of $A\text{-}MPR_c$, and d-$ampr_c$ is the linear value of $D\text{-}AMPR_c$.

Figure 9:
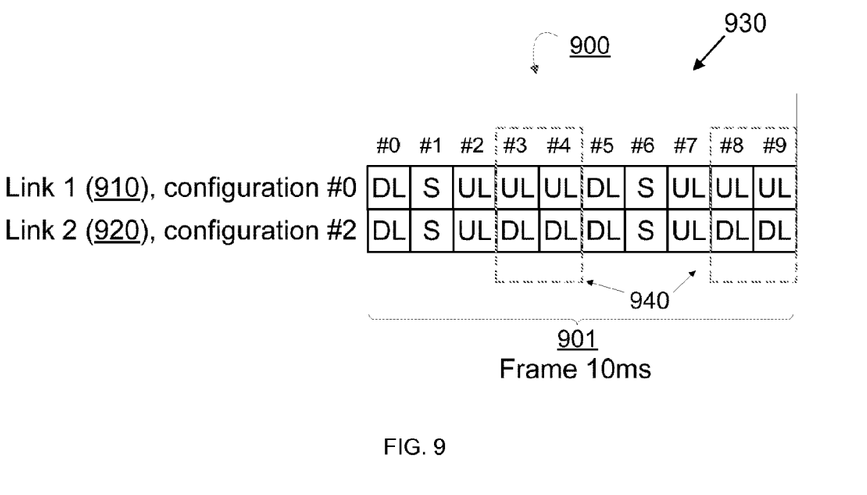
FIG. 9 illustrates one possible example of non-aligned configurations in an inter-band TDD CA scenario in accordance with an alternative embodiment of the present invention.

In future 3GPP releases, inter-band TDD CA may be introduced where each component carrier has a different TDD configuration. To mitigate potential interference from an uplink transmission upon a downlink received signal, in such a scenario some example embodiments of the present invention may dynamically adjust A-MPR of each link as described above. For example, referring now to FIG. 9, one possible example of non-aligned configurations in an inter-band TDD CA scenario is shown 900 in accordance with an alternative embodiment of the present invention. As shown in FIG. 9, Link 1 910 is configured for example in accordance with a first configuration #0 and Link 2 920 is configured for example in accordance with a second configuration #2 in a 10 ms frame 901. Each of the ten sub-frames 930 is designated as either downlink (DL) mode, uplink (UL) mode or special (S) sub-frame mode. A S sub-frame is used to prove a guard time when switching from DL to UL operation. It consists of three parts: a downlink pilot time slot (DwPTS), a guard period (GP) and an uplink pilot time slot (UpPTS).

As shown in FIG. 9, sub-frames may for example be configured such that both Link 1 910 and Link 2 920 operate in either UL and DL mode (e.g. sub-frames #0, #2, #5, and #7) or alternatively operate where UL and DL operations overlap 940 (e.g. sub-frame #3/#4 and #8/#9).

Figure 10A:
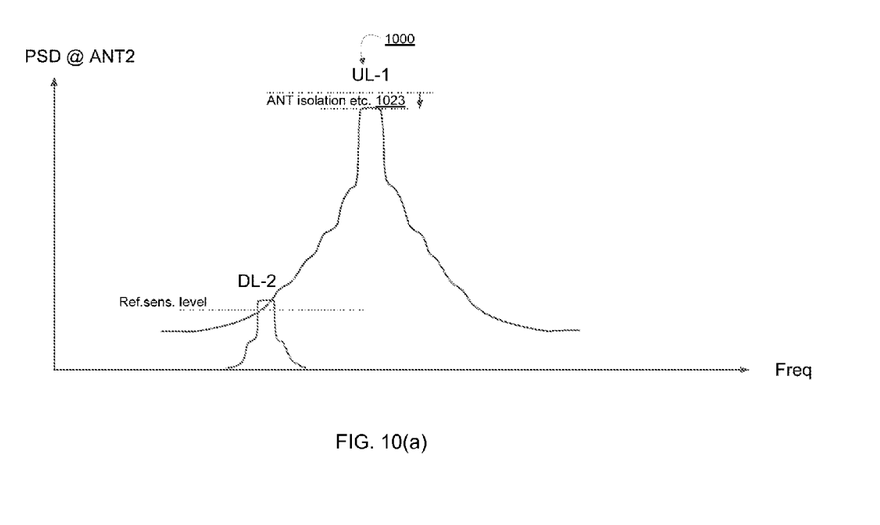
FIG. 10(a) illustrates one possible example where Link 2 and Link 1 are in DL and UL modes, respectively, and observed at antenna 2 in a user equipment.
Figure 10B:
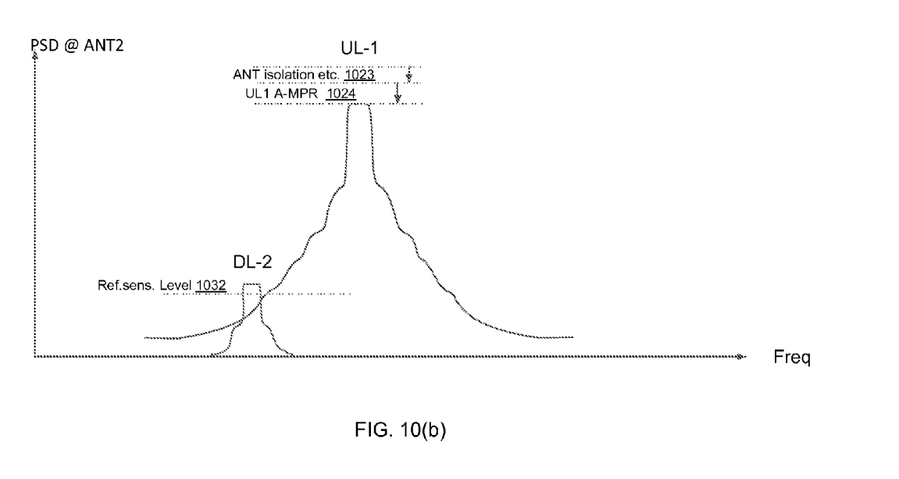
FIG. 10(b) illustrates one possible example where Link 2 and Link 1 are in DL and UL modes, respectively, and observed at antenna 2 in a user equipment selectively applying dynamic A-MPR in accordance with some example embodiments of the present invention.

Referring now to FIGS. 10(a) and 10(b), an illustration of an inter-band TDD CA scenario involving non-aligned configurations is shown in accordance with some example embodiments of the present invention. As shown in FIG. 10(a), an example is shown where Link 2 and Link 1 are in DL and UL modes, respectively and observed at antenna 2 in a user equipment 1000. Like the scenarios shown in FIGS. 1(a), 2(a) and 3(a), isolation 1023 is provided by the front-end module and antenna element in the user equipment to handle UL-1 leakage on DL-2. Since UL1 leak causes desensitisation, A-MPR is needed. However, referring back to FIG. 9, since during sub-frames #2 and #7 both links are in UL mode, no AMPR is needed. Therefore, as shown in FIG. 10(b), dynamic AMPR applied for UL-1 1024 can yield better capacity in this non-limiting example with DL-2 appearing above the reference sense level 1032.

In these regards, the non-limiting example embodiments of this invention may be implemented at least in part by computer software stored on non-transitory memory which is executable by a processor, or by hardware, or by a combination of tangibly stored software and hardware (and tangibly stored firmware). Electronic devices implementing these aspects of the invention need not be the entire devices as depicted by way of example at FIG. 4, but some example embodiments may be implemented by one or more components of same, such as the above-described tangibly stored software, hardware, firmware and processor or micro-controllers, or a system on a chip (SOC) or an application-specific integrated circuit (ASIC).

Various embodiments of the computer readable memory such as those disclosed by way of example in FIG. 4 include any data storage technology type which is suitable to the local technical environment, including, but not limited to, semiconductor based memory devices, magnetic memory devices and systems, optical memory devices and systems, fixed memory, removable memory, disc memory, flash memory, DRAM, SRAM, EEPROM and the like. Various embodiments of the data processors include, but are not limited to, general purpose computers, special purpose computers, microprocessors, digital signal processors (DSPs) and multi-core processors.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device. The reference throughout this disclosure to a UE may be embodied on or by a cellular phone, a personal digital assistant (PDA), a wireless modem, a wireless communication device, a laptop, a netbook, a tablet or any other device cable of communicating with a E-UTRAN, UTRAN or GERAN enabled device.

Further, some of the various features of the above non-limiting example embodiments may be used to advantage without the corresponding use of other described features. The foregoing description should therefore be considered as merely illustrative of the principles, teachings and example embodiments of this invention, and not in limitation thereof.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method comprising:
   receiving a network signal value assigned to one or more carrier aggregation deployment scenarios, from one or more access points in response to a request to employ carrier aggregation;
   identifying, from memory of a user equipment responsive to the received network value, a first set of a plurality of sets of dynamic additional maximum power reduction parameters that is stored in the memory and pre-assigned to the network signal value for carrier aggregation; and
   selectively producing an additional maximum power reduction of a plurality of uplink and downlink signals among two or more radio bands based upon the network signal value and the first set of dynamic additional maximum power reduction parameters,
   wherein the first set of dynamic additional maximum power reduction parameters is identified from the memory responsive to the received network value, to selectively reduce power of one or more first links, according to an activity of one or more second links.

2. A method according to claim 1, wherein the network signal value assignment comprises:
   a first channel bandwidth, a first lowest resource block index, a first contiguous resource block allocation length and a first additional maximum power reduction;
   a second channel bandwidth, a second lowest resource block index, a second contiguous resource block allocation length and a second additional maximum power reduction; and
   a third channel bandwidth, a third lowest resource block index, a third contiguous resource block allocation length and a third additional maximum power reduction.

3. A method according to claim 1, wherein the network signal value assignment comprises:
   assigning one or more channel bandwidths to one or more resource block indexes, one or more contiguous resource block allocation lengths and an additional maximum power reduction corresponding to each assigned one or more channel bandwidths.

4. A method according to claim 1, wherein the two or more radio bands are aggregated in a duplex band of a frequency division duplex band.

5. A method according to claim 1, wherein the plurality of uplink signals employs frequency division duplexing and the plurality of downlink signals employs time division duplexing.

6. A method according to claim 1, wherein the plurality of uplink and downlink signals employs time division duplexing and the one or more first links and one or more second links are adapted for one or more non-aligned configurations within a frame.

7. Apparatus for use in a user equipment, the apparatus comprising:
   processing circuitry configured to cause the apparatus to at least:
   identify, from memory responsive to receiving a network value assigned to one or more carrier aggregation deployment scenarios, a first set of a plurality of sets of dynamic additional maximum power reduction parameters that is stored in memory of the user equipment and pre-assigned to the network signal value for carrier aggregation; and
   selectively produce an additional maximum power reduction of a plurality of uplink and downlink signals among two or more radio bands based upon the network signal value and the first set of dynamic additional maximum power reduction parameters, the network signal value being a received network signal value assigned from one or more access points in response to a request to employ carrier aggregation;
   wherein the first set of dynamic additional maximum power reduction parameters is identified from the memory responsive to the received network value, to selectively reduce power of one or more first links, according to an activity of one or more second links.

8. Apparatus according to claim 7, wherein the network signal value assignment comprises:
   a first channel bandwidth, a first lowest resource block index, a first contiguous resource block allocation length and a first additional maximum power reduction;
   a second channel bandwidth, a second lowest resource block index, a second contiguous resource block allocation length and a second additional maximum power reduction; and
   a third channel bandwidth, a third lowest resource block index, a third contiguous resource block allocation length and a third additional maximum power reduction.

9. Apparatus according to claim 7, wherein the network signal value assignment comprises:
   assigning one or more channel bandwidths to one or more resource block indexes, one or more contiguous resource block allocation lengths and an additional maximum power reduction corresponding to each assigned one or more channel bandwidths.

10. Apparatus according to claim 7, wherein the two or more radio bands are aggregated in a duplex band of a frequency division duplex band.

11. Apparatus according to claim 7, wherein the plurality of uplink signals employs frequency division duplexing and the plurality of downlink signals employs time division duplexing.

12. Apparatus according to claim 7, wherein the plurality of uplink and downlink signals employ time division duplexing and the one or more first links and one or more second links are adapted for one or more non-aligned configurations within a frame.

13. Apparatus according to claim 7, wherein the at least one user equipment comprises:
   a cellular phone, a personal digital assistant,
   a wireless modem, a wireless communication device,
   a laptop computer,
   a netbook,
   a tablet computer, or
   any other device capable of communicating with an Evolved Universal Terrestrial Radio Access Network, Universal Terrestrial Radio Access Network or Global System for Mobile Edge Radio Access Network enabled device.

14. A non-transitory computer-readable storage medium storing a computer program comprising instructions executable by a machine for causing the machine to perform operations, said operations comprising:
   receiving a network signal value assigned to one or more carrier aggregation deployment scenarios, from one or more access points in response to a request to employ carrier aggregation;
   identifying, from memory of the user equipment responsive to the received network value, a first set of a plurality of sets of dynamic additional maximum power reduction parameters that is stored in the memory and pre-assigned to the network signal value for carrier aggregation; and
   selectively producing an additional maximum power reduction of a plurality of uplink and downlink signals among two or more radio bands based upon the network signal value and the first set of dynamic additional maximum power reduction parameters,
   wherein the first set of dynamic additional maximum power reduction parameters is identified from the memory responsive to the received network value, to selectively reduce power of one or more first links, according to an activity of one or more second links.

15. A non-transitory computer-readable storage medium according to claim 14, wherein the network signaling value assignment comprises:
   a first channel bandwidth, a first lowest resource block index, a first contiguous resource block allocation length and a first additional maximum power reduction;
   a second channel bandwidth, a second lowest resource block index, a second contiguous resource block allocation length and a second additional maximum power reduction; and
   a third channel bandwidth, a third lowest resource block index, a third contiguous resource block allocation length and a third additional maximum power reduction.

16. A non-transitory computer-readable storage medium according to claim 14, wherein the network signal value assignment comprises:
   assigning one or more channel bandwidths to one or more resource block indexes, one or more contiguous resource block allocation lengths and an additional maximum power reduction corresponding to each assigned one or more channel bandwidths.

17. A non-transitory computer-readable storage medium according to claim 14, wherein the two or more radio bands are aggregated in a duplex band of a frequency division duplex band.

18. A non-transitory computer-readable storage medium according to claim 14, wherein the plurality of uplink signals employs frequency division duplexing and the plurality of downlink signals employs time division duplexing.

19. A non-transitory computer-readable storage medium according to claim 14, wherein the uplink and downlink signals employ time division duplexing and the one or more first links and one or more second links are adapted for one or more non-aligned configurations within a frame.

* * * * *